US009772176B2

(12) United States Patent
Froggatt et al.

(10) Patent No.: US 9,772,176 B2
(45) Date of Patent: Sep. 26, 2017

(54) OVERLAPPED CHIRPED FIBER BRAGG GRATING SENSING FIBER AND METHODS AND APPARATUS FOR PARAMETER MEASUREMENT USING SAME

(71) Applicant: INTUITIVE SURGICAL OPERATIONS, INC., Sunnyvale, CA (US)

(72) Inventors: Mark E. Froggatt, Blacksburg, VA (US); Justin W. Klein, Winston-Salem, NC (US)

(73) Assignee: Intuitive Surgical Operations, Inc., Sunnyvale, CA (US)

(*) Notice: Subject to any disclaimer, the term of this patent is extended or adjusted under 35 U.S.C. 154(b) by 0 days.

(21) Appl. No.: 14/897,973

(22) PCT Filed: Jun. 10, 2014

(86) PCT No.: PCT/US2014/041685
§ 371 (c)(1),
(2) Date: Dec. 11, 2015

(87) PCT Pub. No.: WO2014/200986
PCT Pub. Date: Dec. 18, 2014

(65) Prior Publication Data
US 2016/0123715 A1    May 5, 2016

Related U.S. Application Data

(60) Provisional application No. 61/834,526, filed on Jun. 13, 2013.

(51) Int. Cl.
*G02B 6/34*       (2006.01)
*G01B 9/02*       (2006.01)
(Continued)

(52) U.S. Cl.
CPC ..... *G01B 9/02002* (2013.01); *G01B 9/02004* (2013.01); *G01B 9/02044* (2013.01);
(Continued)

(58) Field of Classification Search
CPC .......................................... G02B 2006/02157
See application file for complete search history.

(56) References Cited

U.S. PATENT DOCUMENTS

| 6,621,960 B2* | 9/2003 | Wang | G02B 6/02085 385/37 |
| 7,376,306 B2* | 5/2008 | Provost | G02B 6/02195 385/15 |

(Continued)

OTHER PUBLICATIONS

International Search Report for PCT/US2014/041685, mailed Oct. 20, 2014, 3 pages.
(Continued)

*Primary Examiner* — Rhonda Peace
(74) *Attorney, Agent, or Firm* — Nixon & Vanderhye P.C.

(57) ABSTRACT

An optical sensor includes an optical fiber inscribed with a repeated refraction pattern such that light scattered from a location on the optical fiber is scattered at multiple frequencies in a range of frequencies. The inscribed patterns overlap at every measurement point along at least a portion of the length of the sensor. An optical sensing system including control circuitry coupled to the optical fiber detects measurement scatter data from the optical fiber over the range of frequencies, determines a change in the detected measurement scatter data over the range of frequencies, and extracts a parameter describing a state of the optical fiber from the determined change in the detected measurement scatter data. The sensor may be made by inscribing a first light refracting pattern on the optical fiber at every measurement point along at least a portion of the length of the sensor and inscribing a second light refracting pattern on the optical fiber that
(Continued)

overlaps the first inscribed light refracting pattern at every measurement point along at least that portion of the length of the sensor.

26 Claims, 16 Drawing Sheets

(51) Int. Cl.
  *G01B 11/16* (2006.01)
  *G01D 5/353* (2006.01)
  *G02B 6/02* (2006.01)
  *G01M 11/00* (2006.01)

(52) U.S. Cl.
  CPC .......... *G01B 11/161* (2013.01); *G01B 11/18* (2013.01); *G01D 5/35316* (2013.01); *G01M 11/3172* (2013.01); *G02B 6/02042* (2013.01); *G02B 6/02085* (2013.01); *G02B 6/02123* (2013.01); *G02B 6/02114* (2013.01); *G02B 2006/02157* (2013.01)

(56) References Cited

U.S. PATENT DOCUMENTS

| | | | |
|---|---|---|---|
| 9,239,249 B2* | 1/2016 | Hjort | G01M 5/0016 |
| 9,417,057 B2* | 8/2016 | 'T Hooft | G01B 11/16 |
| 2003/0138207 A1 | 7/2003 | Wang et al. | |
| 2004/0101240 A1 | 5/2004 | Viswanathan | |
| 2004/0197050 A1* | 10/2004 | Lovseth | G01B 11/16 385/37 |
| 2006/0204165 A1 | 9/2006 | Froggatt | |
| 2010/0129029 A1 | 5/2010 | Westbrook | |
| 2010/0329602 A1 | 12/2010 | Shah et al. | |
| 2011/0038512 A1 | 2/2011 | Petrou et al. | |
| 2011/0109898 A1 | 5/2011 | Froggatt et al. | |
| 2011/0170823 A1 | 7/2011 | Xia et al. | |
| 2011/0194805 A1 | 8/2011 | Wang et al. | |
| 2011/0310378 A1 | 12/2011 | Froggatt et al. | |
| 2016/0123715 A1* | 5/2016 | Froggatt | G01D 5/35316 356/477 |
| 2017/0052091 A1* | 2/2017 | Mori | G01M 11/088 |

OTHER PUBLICATIONS

Written Opinion of the ISA for PCT/US2014/041685, mailed Oct. 20, 2014, 13 pages.

Bolger et al., "Optimisation of Superimposed Chirped Fibre Bragg Gratings for the Generation of Ultra-high Speed Optical Pulse Bursts," Optics Communications, Elsevier, Amsterdam, NL, vol. 271, No. 2, Jan. 20, 2007 (Jan. 20, 2007), pp. 524-531, XP005855248.

Extended European Search Report for Application No. EP14810406.0, mailed on Jan. 5, 2017, 8 pages.

* cited by examiner

OVERLAPPED CHIRPED FIBER BRAGG GRATING SENSING FIBER AND METHODS AND APPARATUS FOR PARAMETER MEASUREMENT USING SAME

RELATED APPLICATION

This application is the U.S. national phase of International Application No. PCT/US2014/041685 filed 10 Jun. 2014, which designated the U.S. and claims the benefit of U.S. provisional application Ser. No. 61/834,526, filed on Jun. 13, 2013, the entire contents of each of which are incorporated herein by reference.

TECHNICAL FIELD

The technology in this application relates to optical measurement apparatus and techniques.

INTRODUCTION

Strain sensing that is performed based on changes in the properties of a deformed optical fiber provides advantages over resistive strain sensing techniques. See, e.g., "High precision, high sensitivity distributed displacement and temperature measurements using OFDR-based phase tracking," D. K. Gifford, M. E. Froggatt, and S. T. Kreger, *Proc. SPIE*, vol. 7753, p. 775331 (2011), the contents of which are incorporated herein by reference. Optical fiber based strain sensing may use the inherent Rayleigh scatter of the optical fiber (sensor) or the reflected signal produced from written fiber Bragg gratings (FBG). In both, the Optical Frequency Domain Reflectometry (OFDR) measurement technique achieves distributed strain measurements to a high accuracy along the length of the sensor. See, e.g., "High resolution optical frequency domain reflectometry for characterization of components and assemblies," Soller, Gifford, Wolfe, and Froggatt, *Optics Express*, Jan. 24, 2005, the contents of which are incorporated herein by reference. In an OFDR based optical fiber strain sensing application, a given sensor is first measured by an OFDR interrogator to acquire a baseline scattering profile of a light guiding optical core within the optical sensor. This baseline measurement provides both an amplitude profile and a phase profile along the length of the sensor that records how light is scattered from imperfections, or gratings, inherent in the sensor. Due to the amorphous nature of glass and the high softening temperature of the glass used to make optical fiber, the scattering profile of this baseline measurement is highly repeatable. When a sensor experiences a strain, this scattering profile is either elongated or compressed. A subsequent OFDR measurement of a deformed optical sensor can be compared to the baseline measurement to measure the elongation or compression to a high accuracy along the length of the optical sensor. This measure of elongation or compression can be scaled to provide a direct measure of strain which is highly valuable to industries concerned with the measurement of physical forces. Non-limiting examples include structural health monitoring, composite materials, automotive industry, and the aeronautical industry.

The inherent scattering mechanism of an optical fiber sensor—Rayleigh scatter—results from imperfections in the crystalline structure of an optical fiber. Any optical fiber, such as industry standard SMF-28, will possess Rayleigh scatter and can be used as a strain sensor that is inexpensive and easy to manufacture. However, Rayleigh scatter is inherently a weak effect and can encounter issues due to its low signal to noise level. Rayleigh scatter reflects a broadband response at each location along the length of the fiber. In other words, each segment of fiber reflects a unique spectrum that covers the entire frequency range of the laser sweep of a given OFDR interrogation. An example of this unique-broadband spectrum being reflected from two segments along the length of the sensor is depicted in FIG. 1.

Due to the broadband nature of the scattered light, OFDR measurement data and associated baseline data are "delta correlated" when extracting a measure of phase and/or strain. In other words, the spectrum reflected from a given location is sufficiently different from the reflected spectrum of an adjacent segment, that an accurate measure of delay along the length of the fiber must be known in order to make a meaningful comparison/correlation of OFDR measurement data and associated baseline data, which is needed to in turn obtain a meaningful measure of strain along the length of the sensor. This can be a weakness of a Rayleigh scatter measurement approach if the processing to extract meaningful strain responses in a practical sensing environment is extensive. However, the broadband response of Rayleigh scatter does allow a direct measure of delay as described for example in "Optical Position and/or Shape Sensing," US 20110109898, the contents of which are incorporated herein by reference. Further, the broadband response enables advanced techniques such as the use of an extended reference as described for example in "Registration of an Extended Reference for Parameter Measurement in an Optical Sensing System," US 2011038512, the contents of which are incorporated herein by reference. While Rayleigh scatter is a weak signal, the broadband nature also allows several strategies to improve robustness of a given strain measurement if the processing can be afforded in a given application.

FBGs written with a high density along the length of the optical sensor is another approach in optical fiber based strain sensing. Each FBG location along the length of the fiber reflects a discrete frequency based on the periodicity of the written grating. FIG. 2 depicts an example of how each location along the fiber reflects the same discrete frequency based on the period of the written grating. The signal strength of a FBG sensor is on the order of three times greater than that of a Rayleigh scatter based sensor. This increased signal reduces overall noise of a given strain measurement and facilitates deployment of a sensor by enabling more optical connections to be used when connecting a sensor to an OFDR instrument. The spectrum reflected from any given segment of fiber along the length of a sensor is similar with an FBG based sensor. This alleviates the restrictions on the accuracy of the delay between a measurement and baseline for extraction of a strain measurement. In other words, if a segment of fiber is not compared to the exact physical segment in the baseline measurement, a usable strain signal can still be extracted. However, the narrow frequency response of the fiber does not provide a direct measure of delay along the length of the sensor. Thus, the increased robustness of the strain measurements comes at the cost of a reduced accuracy level. The narrow frequency response of an FBG also prevents the use of broadband strategies such as an extended reference. In addition, a continuous FBG based fiber is difficult to manufacture. When writing FBG's, contiguous gratings must be properly aligned to avoid distortions at the stitch interface. Thus, a continuous FBG based fiber may have distortions at the stitch interfaces reducing manufacturing yields. As the measurement and reference become misaligned in delay, these interfaces can cause distortions in a reconstruction of strain. An example of such a manufacture defect is depicted in FIG. 3.

In FIG. 3, a measurement and baseline aligned in delay are compared and the phase difference is depicted. As the measurement and baseline become misaligned by a single unit of OFDR spatial resolution, the FBG sensor experiences a delay mismatch between a measurement and a baseline scan of the fiber, and phase distortions at the interface between gratings manifest are observed.

In summary, a Rayleigh scatter based sensor has the advantages of a direct measurement of delay along the length of the sensor, broadband strategies such as use of an extended reference are available, and the sensors are easy to manufacture. However, Rayleigh scatter based sensors are delta correlated due to their broadband nature and are susceptible to environmental distortions. Further, Rayleigh scatter is a weak effect causing the sensors to suffer from a low signal to noise level. Conversely, FBG based fibers are not delta correlated and provide an easy measure of strain in aggressive sensing environments such as a fiber that experiences motion during a measurement. Further, FBG sensors are on the order of 3-4 times stronger than a typical Rayleigh scatter fiber. However, FBG sensors do not allow a measure of delay causing a given level of uncertainty in a strain measurement. The narrow band response does not allow a direct measurement of delay and prevents broadband strategies from being utilized.

SUMMARY

An example aspect of the technology described in this application includes an optical sensor that includes an optical fiber inscribed with a repeated refraction pattern such that light scattered from a location on the optical fiber is scattered at multiple frequencies in a range of frequencies. At least two of the inscribed patterns overlap at every measurement point along at least a portion of the length of the sensor. In a preferred embodiment, the pattern includes overlapping chirped frequency fiber Bragg gratings and at least two of the refraction patterns overlap at every point along the entire length of the sensor. In another embodiment, the optical sensor may also include multiple optical light guiding cores within the optical fiber, where each of the multiple optical light guiding cores is inscribed with the repeated refraction patterns.

Another aspect includes an optical sensing system that includes the optical sensor along with control circuitry that detects measurement scatter data from the optical fiber over the range of frequencies and determines a change in the detected measurement scatter data over the range of frequencies. A parameter describing a state of the optical fiber is determined based on the determined change in the detected measurement scatter data.

Examples of the parameter includes a measure of strain along a length of the optical sensor, a measure of change in optical phase along a length of the optical sensor, or a measure of delay along a length of the optical sensor.

In an example implementation, the control circuitry obtains baseline scatter data for the optical sensor and determines the delay based on a comparison that uses the baseline scatter data and the detected measurement scatter data. The delay may be used for example to compensate for a misalignment between the baseline scatter data and the detected measurement scatter data. In one example, the optical sensing system detected measurement scatter data with a scattering amplitude greater than 10 dB.

In an example implementation, the control circuitry obtains baseline scatter data for the optical sensor and Fourier transforms the baseline scatter data from a temporal domain into a spectral domain. A first half spectral response of the baseline scatter data and a second half spectral response of the baseline scatter data are generated. Similarly, the detected measurement scatter data are Fourier transform from the temporal domain into the spectral domain, and a first half spectral response of the detected measurement scatter data and a second half spectral response of the detected measurement scatter data are generated. The first half spectral response of the baseline scatter data and the first half spectral response of the detected measurement scatter data are processed to determine a first result. The second half spectral response of the baseline scatter data and the second half spectral response of the detected measurement scatter data are processed to determine a second result. A measure of the delay is determined based on the first and second results. A phase difference may also be determined from the processed spectral responses.

When the pattern includes overlapping chirped frequency fiber Bragg gratings, another example feature is to determine a measure of a phase slope associated with a chirp rate of a grating and compare the measure phase slope to a phase slope generated from a baseline scatter measurement of the optical fiber. A measure of strain and/or delay at a location on the optical fiber may be determined based on the phase slope comparison. Moreover, the measured phase slope may be compared to a phase slope generated from a baseline scatter measurement of the optical fiber to determine a phase offset. A measure of delay at a location on the optical fiber may then be determined based on the phase offset. In another example embodiment, the detected measurement scatter data is used to determine a measure of delay along the length of the sensing fiber, and the measured delay is used to determine a measure of strain along the length of the optical fiber. In yet another example embodiment, a measure of delay along a length of the optical sensor may be determined by analyzing amplitude fluctuations in the gratings inscribed along the length of the sensor due to interference of the written gratings. Still further, one or more of the chirped frequency fiber Bragg grating scattering responses may be filtered out from the overlapped chirped frequency fiber Bragg grating responses at a location along the optical sensor. An example extended reference application where the control circuitry includes OFDR circuitry permits a reflection wavelength of the overlapping chirped frequency fiber Bragg gratings to exceed a wavelength range of the OFDR circuitry but still allows spectral shifts greater than a scan range of the OFDR circuitry to be measured by the OFDR circuitry.

Another example aspect of the technology includes a method for making an optical sensor that includes an optical fiber. The method includes inscribing a first light refracting pattern on the optical fiber at every measurement point along at least a portion of the length of the sensor, and inscribing a second light refracting pattern on the optical fiber that overlaps the first inscribed light refracting pattern at every measurement point along at least the portion of the length of the sensor. The optical fiber inscribed with the overlapping first and second light refracting patterns scatters light from a location on the optical fiber at multiple frequencies in a range of frequencies. The first and second light refracting patterns can be overlapping chirped frequency fiber Bragg gratings and/or can overlap at every point along the entire length of the sensor. The first and second light refracting patterns create an overlapped modulated index of refraction pattern.

DETAILED DESCRIPTION

Figure 1:
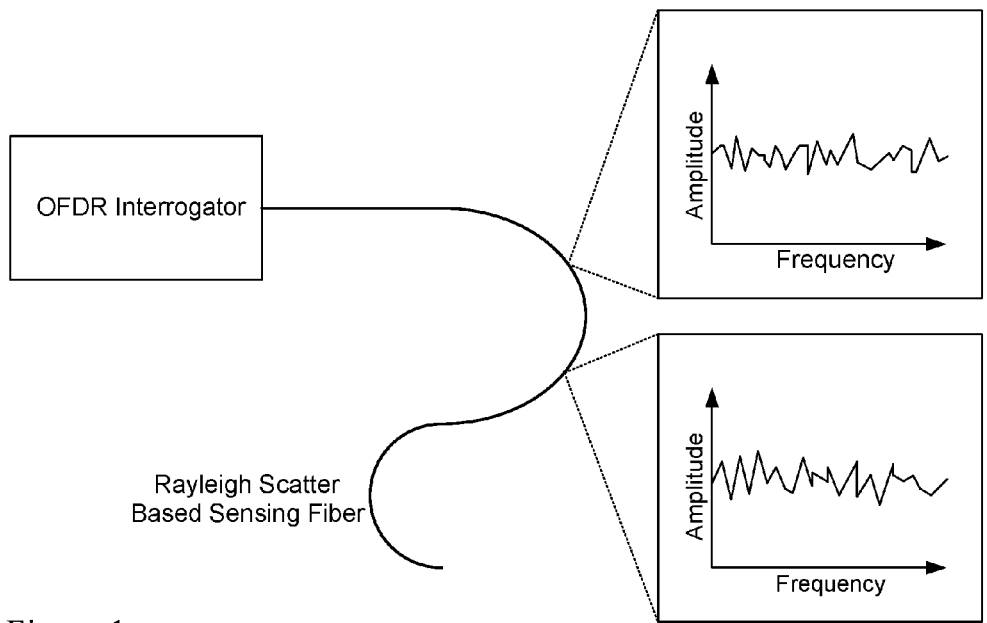
FIG. 1 shows an example of a unique broadband spectrum being reflected from two segments along the length of an optical fiber sensor.
Figure 2:
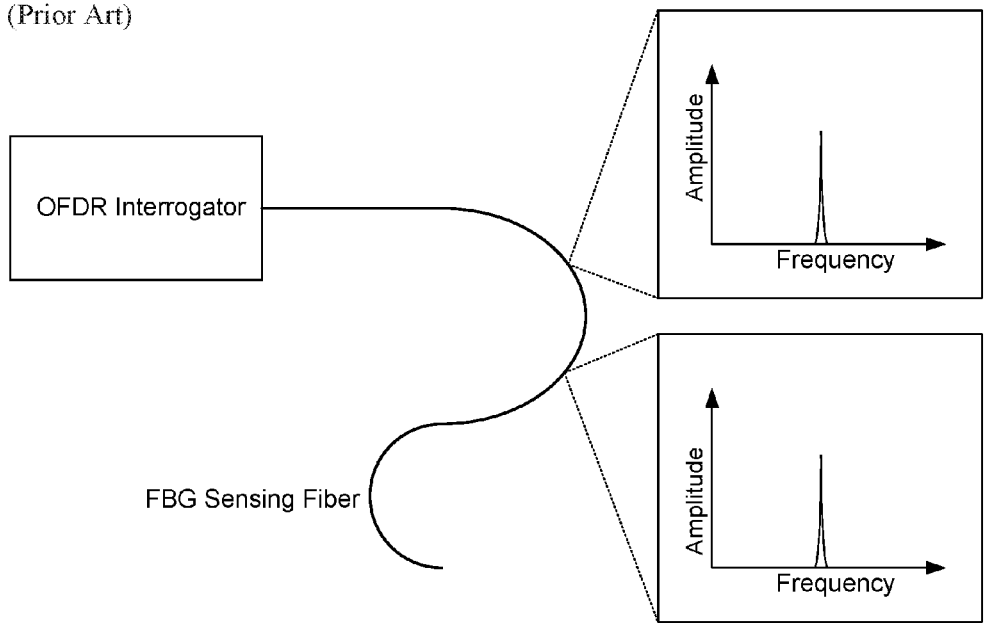
FIG. 2 depicts an example of how each location along a fiber reflects the same discrete frequency based on the period of the written grating.
Figure 3:
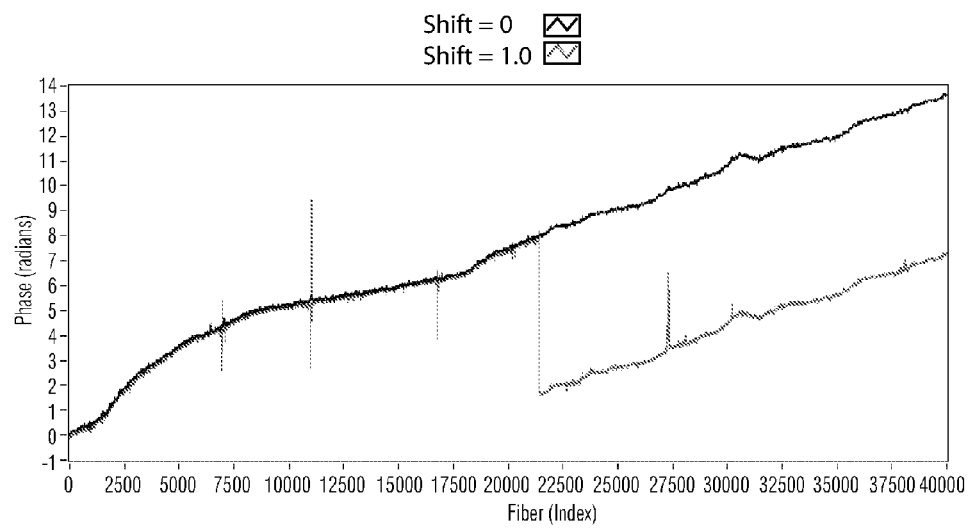
FIG. 3 is a graph showing comparison of OFDR measurement and baseline scans aligned in delay with the phase difference depicted.

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using optical components, electronic components, hardware circuitry (e.g., analog and/or discrete logic gates interconnected to perform a specialized function, ASICs, PLAs, etc.), and/or using software programs and data in conjunction with one or more digital microprocessors or general purpose computers. Moreover, certain aspects of the technology may additionally be considered to be embodied entirely within any form of computer-readable memory, such as solid-state memory, magnetic disk, or optical disk containing an appropriate set of computer instructions that would cause a processor to carry out the techniques described herein.

Hardware implementations of certain aspects of the technology may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Unless the context indicates otherwise, the terms "circuitry" and "circuit" are used herein to refer to structures in which one or more electronic components have sufficient electrical connections to operate together or in a related manner. In some instances, an item of circuitry can include more than one circuit. An item of circuitry that includes a processor may sometimes include hardware and software components. Software refers to stored or transmitted data that controls operation of the processor or that is accessed by the processor while operating, and hardware refers to components that store, transmit, and operate on the data. The distinction between software and hardware is not always clear-cut, however, because some components share characteristics of both. A given processor-implemented software component can often be replaced by an equivalent hardware component without significantly changing operation of circuitry, and a given hardware component can similarly be replaced by equivalent processor operations controlled by software.

Circuitry can be described structurally based on its configuration or other characteristics. For example, circuitry that is configured to perform control operations is sometimes referred to as control circuitry and circuitry that is configured to perform processing operations is sometimes referred to as processing circuitry.

In general, interfaces, processors, servers, memories, detectors, user interfaces, and other items may be included in a system in which they are operated automatically or partially automatically. The term system and the term apparatus both refer to a combination of two or more parts or components that can perform an operation together. A system and an apparatus may be characterized by configured operation.

Various forms of computer readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways.

An overlapped-chirped fiber Bragg grating (CFBG) scattering mechanism is described that possesses the strengths of Rayleigh scatter and FBG based sensing techniques, but is not susceptible to their respective weaknesses. The term "chirped fiber Bragg grating" refers to a grating with an index of refraction modulation that varies along the length of fiber. A standard fiber Bragg grating, on the other hand, has a constant index of refraction modulation along the length of the fiber causing only a single optical frequency to be reflected along the length of a fiber. Hence, a chirped fiber Bragg grating reflects a different frequency depending on the location along the grating. An overlapped fiber Bragg grating means that several gratings have been written along the length of the fiber such that their respective index of refraction modulations are partially superimposed along the length of the sensor. In an example strain sensing application, using an overlapped CFBG fiber sensor substantially simplifies the data processing needed to extract a measure of deformation along the length of an optical sensor, which is a significant advantage for example in optical fiber-based strain sensing.

Figure 4A:
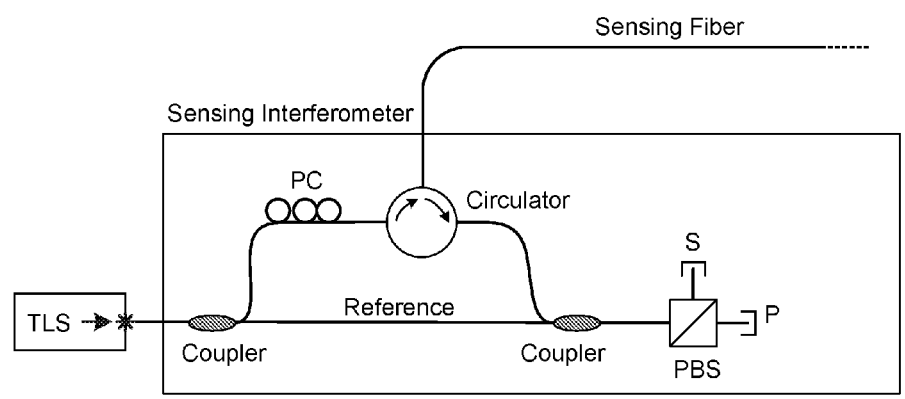
FIG. 4A shows an example OFDR sensing network.

However, to assist the reader, some background and terminology associated with fiber optic strain sensing with OFDR are provided and explained. An OFDR measurement is acquired by measuring an interference pattern produced by mixing scattered light with a reference path and generating an interference pattern at a photodetector as a tunable light source (TLS) is swept through a range of optical frequencies as depicted in FIG. 4A.

Light from a tunable laser source (TLS) is launched into a pair of independent optical fiber interferometers, separated by a fiber optic coupler. In the sensing interferometer, the incoming light is further split into two paths. In the upper path, the light passes through a polarization controller (PC) and a circulator before entering the sensing fiber. Along the length of the sensing fiber, small fractions of the incident light are reflected. The reflected light propagates back down the sensing fiber, through the circulator, and is recombined with the incident light from the reference path at a fiber optic coupler. A polarization beamsplitter (PBS) splits the light into two orthogonal polarization states S and P, and the split interference pattern is detected independently at photodetectors labeled S and P.

This interference pattern includes data in the spectral domain and represents the frequency response of a length of sensing fiber. A subsequent Fourier transform of the interference pattern data produces corresponding data in the temporal domain which contains information detailing the scattering response of the fiber. An OFDR measurement is commonly displayed as scattering amplitude verse delay along the length of the fiber. The term delay relates to the principle that light travels a given distance based on the speed of light and the index of refraction of a material. When considering optical signals, it is convenient to represent distance as delay to remove the ambiguity associated with changes in index of refraction of a material along the length of a sensor. Even though scattering amplitude is commonly depicted, the signal is complex-valued with both an amplitude and a phase response.

A useful property of an OFDR measurement is related to a property of a Fourier transform. Each measurement "point" in the temporal domain represents the entire frequency response of that location as a tunable laser is swept through a range of frequencies.

Figure 4B:
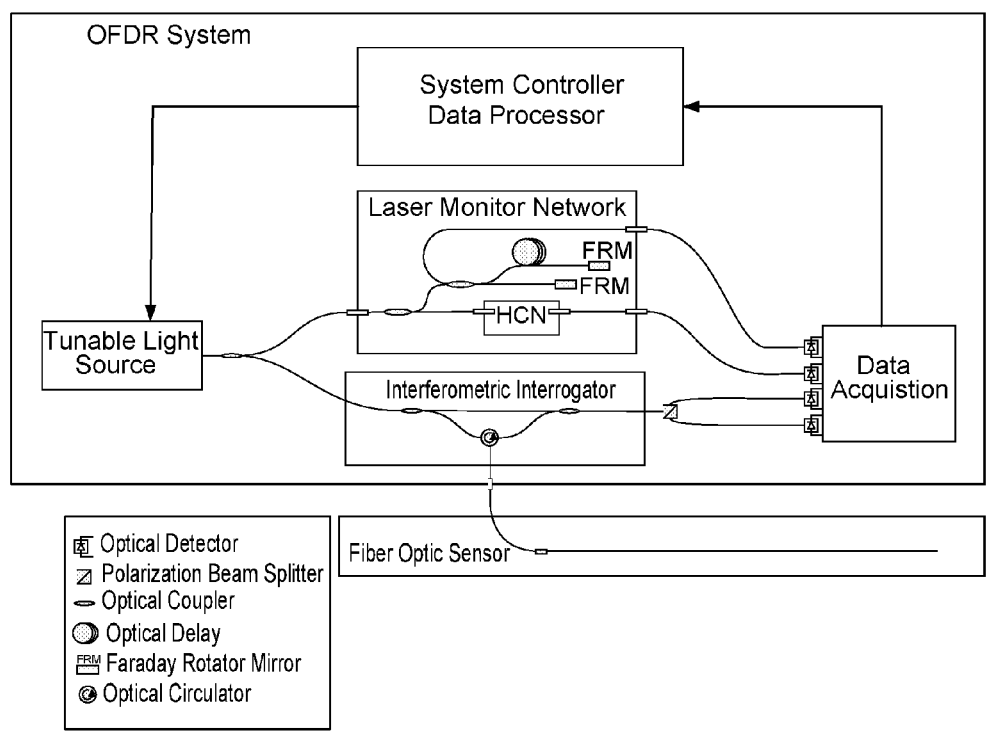
FIG. 4B shows further example details of an OFDR system.

FIG. 4B shows an example OFDR system connected to a fiber optic sensor. The OFDR system includes a tunable light source, an optical network that includes a measurement interferometer and a laser monitor interferometer, a Rayleigh scatter data acquisition (DAQ) system, a system controller data processor including one or more microprocessors for performing processing of Rayleigh scatter data stored in memory along with various processing programs including one or more correlation algorithms. The system controller initiates the sweep of the tunable laser source over an optical frequency range. The light is split between the laser monitor optics and measurement optics. The laser monitor optics typically includes an absolute wavelength reference (though not shown in FIG. 4B) and a relative phase monitor. In a typical reflection OFDR measurement, the light input to the measurement interferometer is split between a reference path and the fiber optic sensor. Reflected light from the sensor comes back through the same path used to inject light into the sensor. In a simple example embodiment of a transmission OFDR instrument, the light input to the measurement interferometer is split between a reference path and the sensor, and the light comes back into the measurement interferometer through an output port of the device. In both receive (Rx) and transmit (Tx) type OFDR measurements, the light from the reference path and the light that traverses the sensor is interfered, and the interferogram is split by a polarization beam splitter (PBS) and then detected by photo-sensitive s and p detectors. The interferograms are converted by the DAQ into electronic signals representing detected Rayleigh scatter from the sensor, and the signals from the laser monitor are detected and used by the system controller to resample the measured Rayleigh scatter signals to equal optical frequency increments. Signals from an absolute wavelength reference (not shown in FIG. 4B) are used to spectrally register the acquired data as a function of absolute optical frequency. The system controller Fourier Transforms the resampled data into the temporal domain for filtering and time domain response analysis such as, for example, determination of return loss, group delay, birefringence, beat length, polarization extinction ratio, and optical phase versus delay down the device, and/or construction of the device Jones Matrix. The measurement data may then be Fourier Transformed back to the optical frequency domain for optical frequency domain analysis to determine, for example: insertion loss, phase, group delay, chromatic dispersion, polarization dependent loss, differential group delay, versus optical frequency or wavelength.

Figure 5:
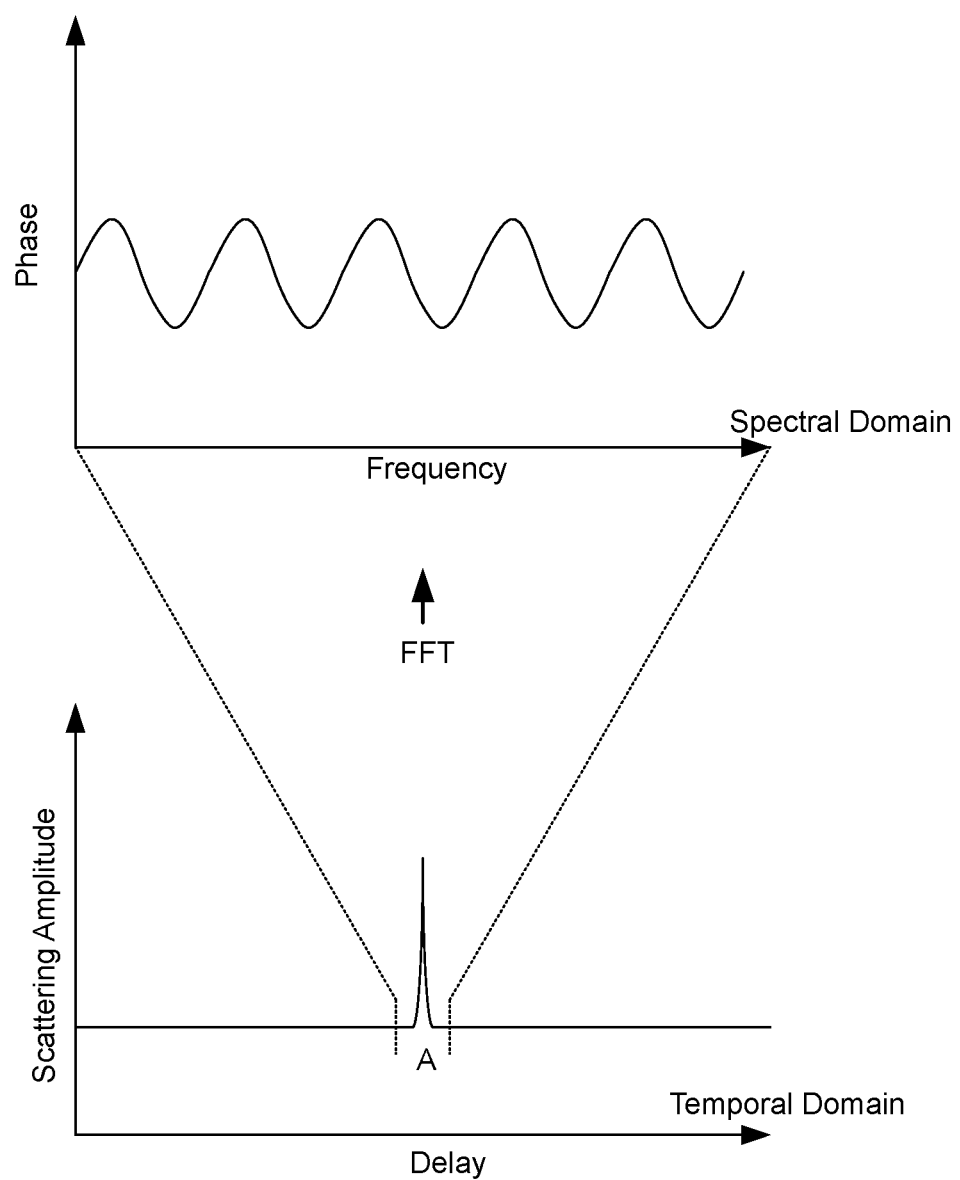
FIG. 5 depicts a relationship between a spectral and temporal domain of a given OFDR measurement.

Consider now the example in FIG. 5 in which an ideal fiber has only a single reflective event along the length of the fiber. If OFDR data produced from this hypothetical fiber was segmented around that reflective event, an inverse Fourier transform of that segment would produce a spectral response with a single frequency in the spectral domain. It can be shown that the frequency response observed for a given fiber type is based on the scattering mechanism of that fiber type. Further, techniques used to measure strain for a given fiber type are adapted to the method of scattering.

With strain sensing based on scattered light, example embodiments perform a phase-based calculation of deformation along the length of the core. This enables higher accuracy strain measurements as compared to other strain sensing techniques due to the ability to detect sub-index changes in length. See "Optical Position and/or Shape Sensing," US 20110109898, the contents of which are incorporated herein by reference. When a given OFDR measurement is acquired, it possesses both a phase and amplitude response along the length of the sensing fiber. When compared to a baseline measurement, an optical phase difference can be extracted along the length of the fiber. As light traverses a distance, it accumulates optical phase. Thus, by gaining a measure of the phase difference along the length of the fiber, one can gain a measure of the how much the length of the fiber has changed.

Large changes in the fiber's state of strain can complicate strain measurements. Uniform strain and temperature can cause the overall length of a sensor to change. This elongation or compression of the fiber results in a misalignment of measurement data relative to the baseline data. In a fiber with constant strain or at a constant elevated temperature, the measurement and reference data sets become increasingly misaligned along the fiber's length. This deviation can be considered as a reduction or loss in coherence, and it can prevent the strain sensing technique from making a measurement of phase and/or strain. See "Optical Position and/or Shape Sensing," US 20110109898. In order to account for this phenomenon, a delay tracking approach can be utilized. In this context, tracking delay along the length of the fiber sensor means measuring how misaligned the OFDR baseline and measurement data have become in terms of distance.

To summarize, a baseline scattering profile is obtained in the temporal domain with an OFDR instrument. The frequency response in the spectral domain at a location along the sensor is determined using fiber scattering. A subsequent OFDR measurement can be performed to measure the response of a deformed sensor. By comparing the deformed OFDR measurement to the baseline scatter pattern, a measure of change in phase along the length of the sensor is determined. This change in phase is proportional to change in length of the sensor, and a derivative of this change in length is a direct measure of strain along the length of the sensor. A delay mismatch can exist between a measurement OFDR scan and a baseline OFDR scan if a strain causes a change in length that misaligns the measurement and baseline data in physical length. Thus, to accurately measure phase and/or strain, tracking delay along the length of the sensor is needed.

The inventors realized that if an optical fiber sensor is constructed having a broadband response that is not "delta-correlated" a more robust sensor can be produced with simplified data processing requirements to determine one or more parameters like strain. The term "delta-correlated" refers to when a measurement OFDR scan and a baseline OFDR scan of a fiber must be aligned to a high accuracy in physical distance along the length of the fiber in order to accurately compare them and produce a valid parameter (e.g., strain) measurement, e.g., during parameter processing. The inventors produced such an optical fiber sensor with an overlapped pattern of index of refraction modulations written into a fiber such that multiple discrete frequencies are scattered at each location along the length of the fiber. Hence, each location along the chirped fiber Bragg grating (CFBG) fiber reflects a designed, broadband response.

Figure 6:
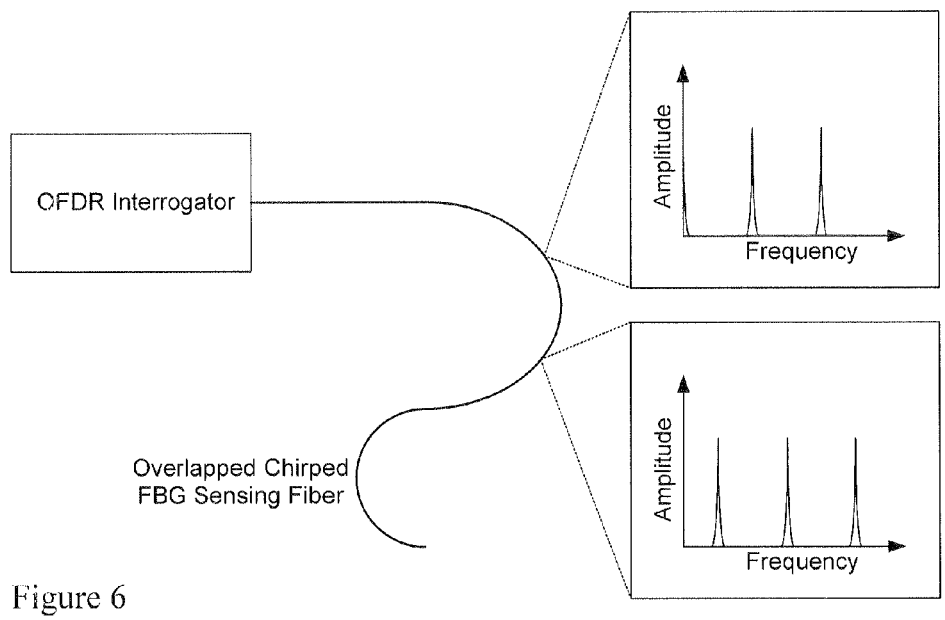
FIG. 6 shows a non-limiting example of a CFBG fiber sensor.

A non-limiting example of a CFBG fiber sensor is depicted in FIG. 6. An overlapped chirped fiber Bragg grating fiber sensor reflects several discrete frequencies at a single location along the length of the fiber. Due to the chirped nature of the written Bragg gratings, a location further along the sensor will reflect a different set of discrete frequencies dependent on the slope (frequency/distance) of the grating and the distance advanced. The CFBG fiber offers increased signal strength, avoids defects as a result of contiguous gratings, provides a broadband response for the direct measure of delay, enables broadband strategies such as an extended reference, and allows strain to be measured in a fashion that is not delta correlated (aligned) with a baseline OFDR measurement causing strain measurements to be more robust in the presence of sensor motion.

A non-limiting example CFBG fiber was constructed and tested. Testing showed the CFBG fiber to be more robust than conventional fiber types used in optical fiber based strain sensing while still providing accurate strain measurements.

A CFBG fiber has several chirped FBGs "written" on the fiber such that they overlap along the length of the sensing fiber. Preferably, the chirped FBGs are densely overlapped.

By way of background, an FBG is a type of reflector constructed in a short segment of optical fiber that reflects particular wavelengths of light and transmits all others. This is achieved by creating a periodic variation in the refractive index of the fiber core, which generates a wavelength specific dielectric mirror. A fiber Bragg grating can therefore be used as an inline optical filter to block certain wavelengths or as a wavelength-specific reflector. Fiber Bragg gratings are created by inscribing or writing a systematic (periodic or aperiodic) variation of refractive index into the core of optical fiber using an intense ultraviolet (UV) source such as a UV laser. A typical FBG is "written" into the fiber such that a single optical frequency is reflected along the entire length of the fiber based on the period of the written grating. There are various ways to write a grating into a fiber such as using interference and masking processes. For photomasking, for example, a photomask is placed between the UV light source and the photosensitive fiber. The shadow of the photomask then determines the grating structure based on the transmitted intensity of light striking the fiber. Complex grating profiles can be manufactured by exposing a large number of small, partially overlapping gratings in sequence. Advanced properties such as phase shifts and varying modulation depth can be introduced by adjusting the corresponding properties of the subgratings. The following FIGS. 7-12 and associated text explain this technology in detail.

Figure 7:
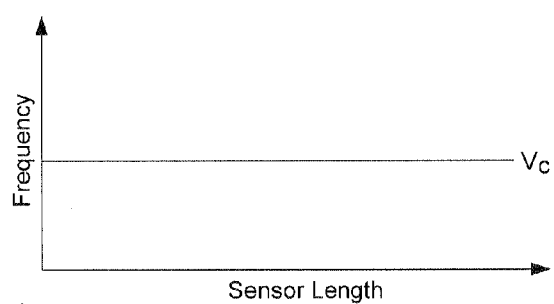
FIG. 7 depicts an example of an FBG fiber reflecting a single frequency, $v_c$, along the length of a sensor.
Figure 8:
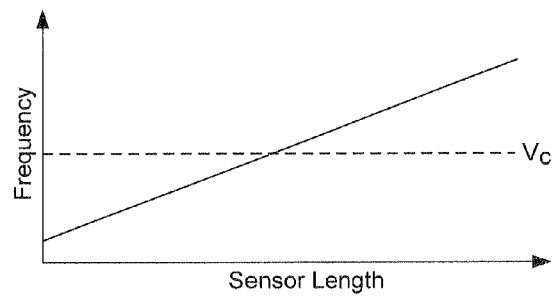
FIG. 8 illustrates an example of how the reflected frequency of a chirped FBG sensor is dependent on the location along the length of the sensor.

FIG. 7 depicts an example of an FBG fiber reflecting a single frequency, $v_c$, along the length of a sensor. A chirped FBG differs from a single frequency fiber in that the reflected frequency is dependent on the location along the length of the sensor. The positive slope line in FIG. 8 is an example of how the reflected frequency of a chirped FBG sensor is dependent on the location along the length of the sensor. In an overlapped chirped FBG fiber, a given location along the length of the fiber, see example point A, reflects multiple different and discrete frequencies as shown in FIG. 9.

Figure 9:
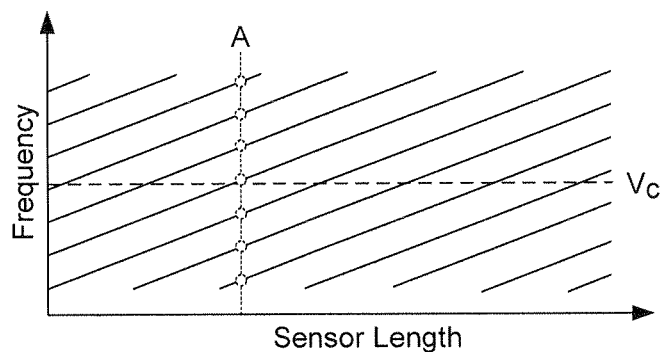
FIG. 9 shows an overlapped chirped FBG fiber reflecting multiple discrete frequencies at a single location along the length of the sensor.

FIG. 9 shows an overlapped chirped FBG fiber reflecting multiple discrete frequencies at a single location along the length of the sensor.

Figure 10:
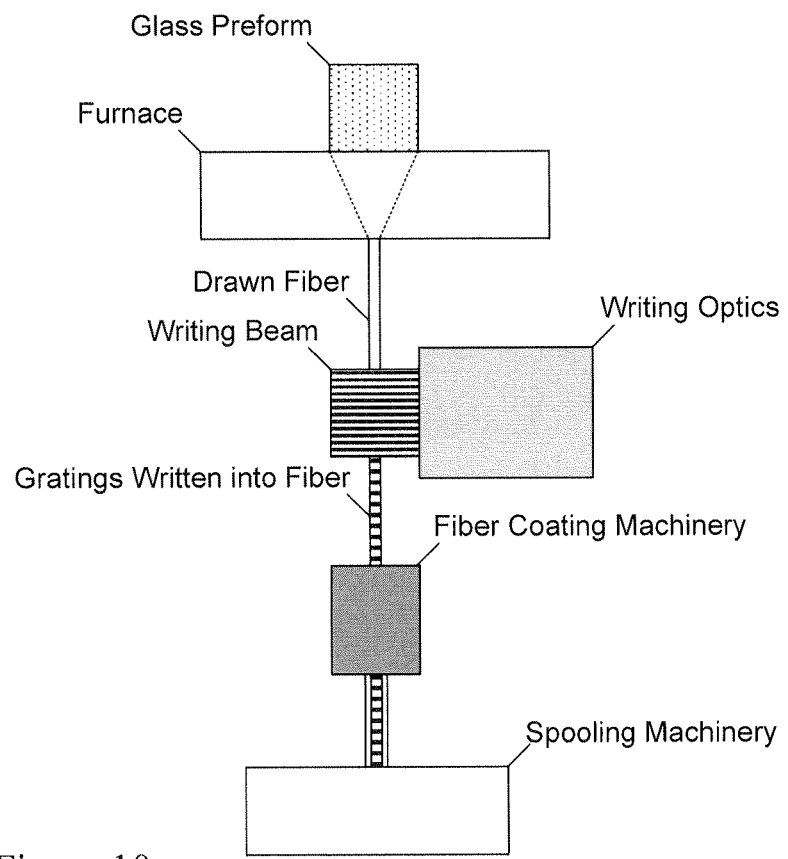
FIG. 10 is a diagram illustrating a schematic of an example optical fiber draw tower used to manufacture optical fiber with optics for writing gratings into the fiber.

FIG. 10 is a diagram illustrating a schematic of an example optical fiber draw tower used to manufacture optical fiber with optics for writing gratings into the fiber. The manufacture of a Bragg grating type optical fiber may be performed similar to that of industrial standard optical fiber, such as Corning SMF-28. FIG. 10 shows an optical fiber drawer tower. A glass preform of both cladding and optical core material is heated in a furnace that brings the glass into a molten state. It is drawn to the correct diameter as it exits the furnace. The drawn optical fiber is coated with a protective coating, such as Polyimide. Once coated, the optical fiber is spooled and the process completes.

When gratings are written into the optical fiber, writing optics are placed within this process. Based on the type of protective coating, the grating writing optics can be placed before or after the fiber coating machinery. A writing beam is timed such that a grating is written when the drawn fiber advances the width of the writing beam. Gratings can be written with a UV source and are controlled through the use of a phase mask which controls the properties of the written grating.

Figure 11A:
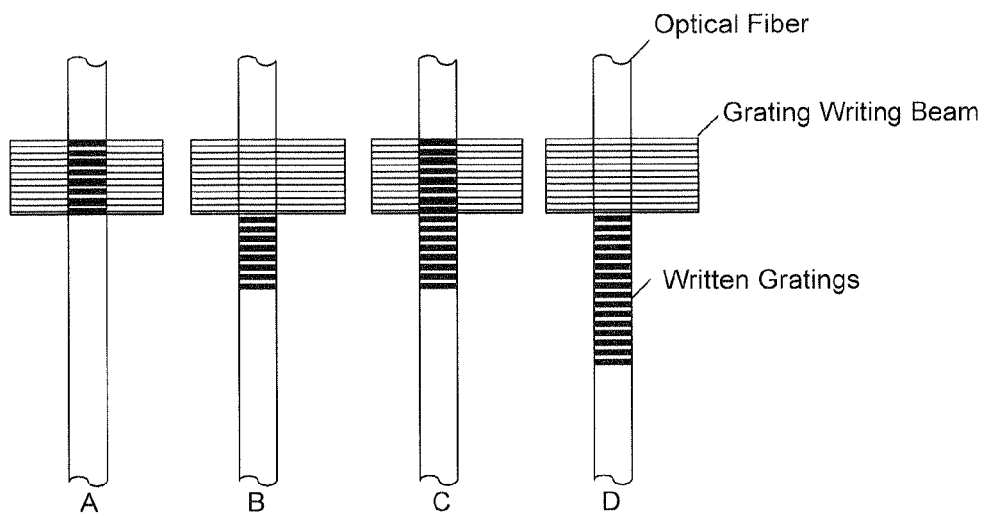
FIG. 11A shows an example of producing a continuous grating fiber with a limited writing beam width.

FIG. 11A shows an example of producing a continuous grating fiber with a limited writing beam width during the drawing process. The writing optics produce a beam of short duration that writes the gratings into the optical fiber (A). The draw tower advances the drawn optical fiber a distance equal to the width of the writing beam (B). The writing optics once again write a grating into the optical fiber producing a grating continuous with the previous written section (C). The process completes along the length of the drawn fiber (D).

Figure 11B:
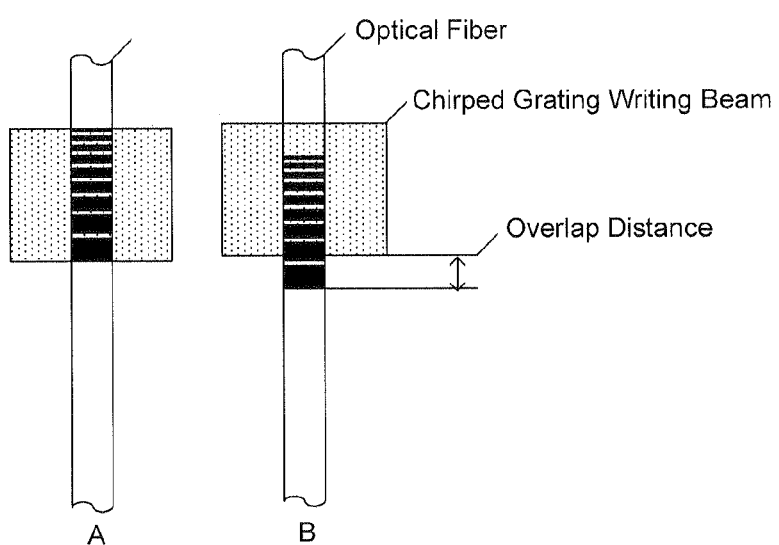
FIG. 11B shows an example process for producing an overlapped, chirped grating fiber.

The type of grating written into the fiber is controlled by modifying the writing optics. FIG. 11B shows an example process for producing an overlapped, chirped grating fiber. A chirped grating fiber is produced by creating a grating phase mask that produces a grating that reflects a different frequency along the length of the writing beam (A). To create an overlapped, chirped grating fiber, the writing beam is activated before the draw tower has advanced the optical fiber a distance greater than the width of the writing beam (B). Since the grating is designed to reflect a different frequency along the width of the writing beam, interference is minimized in the regions of overlap when the fiber is advanced a given overlap distance.

Figure 12:
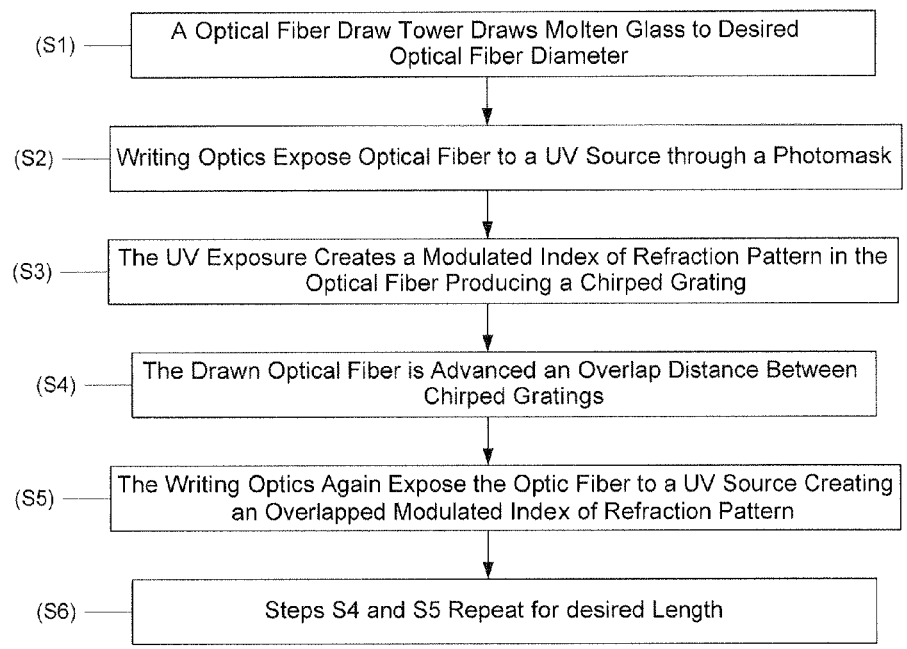
FIG. 12 is a flowchart diagram illustrating an example manufacturing procedure for making an overlapped, chirped grating fiber.

FIG. 12 is a flowchart diagram illustrating an example manufacturing procedure for making an overlapped, chirped grating fiber. First, an optical fiber draw tower draws molten galls to a desired optical fiber diameter (step S1). Writing optics expose optical fiber to a UV source through a photomask (step S2). The UV exposure creates a modulated index of refraction pattern in the optical fiber producing a chirped grating (step S3). The drawn optical fiber is advanced an overlap distance between chirped gratings (step S4). The writing optics again expose the optic fiber to a UV source creating an overlapped modulated index of refraction pattern (step S5). Steps S4 and S5 may be repeated for a desired length along the fiber. These procedures may also be applied to each optical core of a multi-core fiber.

An example application for measuring strain with a CFGB sensing fiber is now described. As explained earlier, a Rayleigh scatter response produces a signal that is compared (e.g., delta correlated) with the baseline reference data. Unlike Rayleigh scatter comparisons, a FBG fiber does not have a spatial restriction on the delay that exists between a measurement and baseline scatter response. The CFBG fiber is a hybrid of these two scattering mechanisms with multiple discrete frequencies overlapping at each location along the sensor fiber. As a result, coherence between measurement and baseline data will be recovered periodically along the length of the sensing fiber. Hence, an estimate of strain applied to a fiber can be obtained by comparing measurement and baseline data points within a measurement scan. This strain sensing technology is based on measuring changes in slope of the chirped grating along the length of the sensing fiber. For the example fiber built for test purposes, a spacing of 5 nm between gratings produces a coherence every two indices in the temporal domain for a 10 nanometer scan and four indices for a 20 nanometer scan. Thus, strain is proportional to the following:

$$\in \propto \angle T_n T_{n-p}^* \tag{1}$$

In the above equation, strain $\in$ is proportional to the phase change between a complex valued point in the delay domain (T) at index (n) and a previous point separated by the distance to the next coherent location (p). As an example, a twisted multicore-optical fiber constructed with CFBGs was placed into a series of bends, and the strain response shown in FIG. 13 was extracted by executing the above computation along the length of the sensor.

Figure 13:
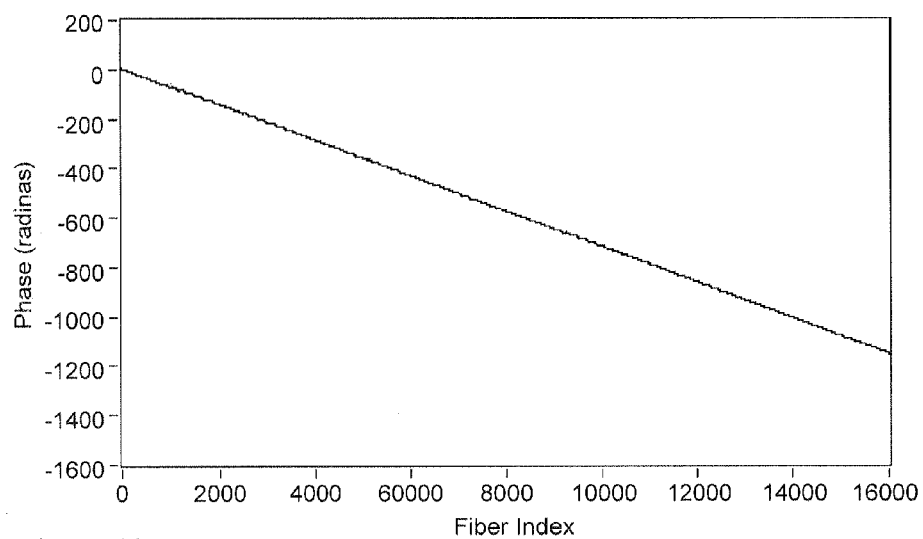
FIG. 13 shows an example strain response resolved by comparing neighboring indices at location of coherence in the temporal domain.
Figure 14:
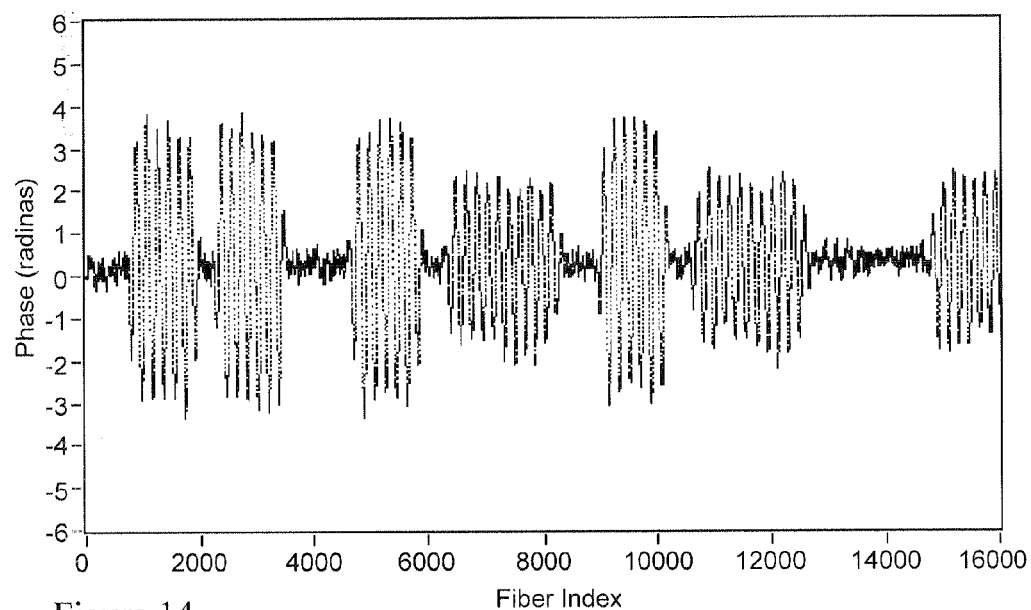
FIG. 14 illustrates an example strain response calculated from coherent location with an OCFBG after removal of a baseline response.
Figure 15:
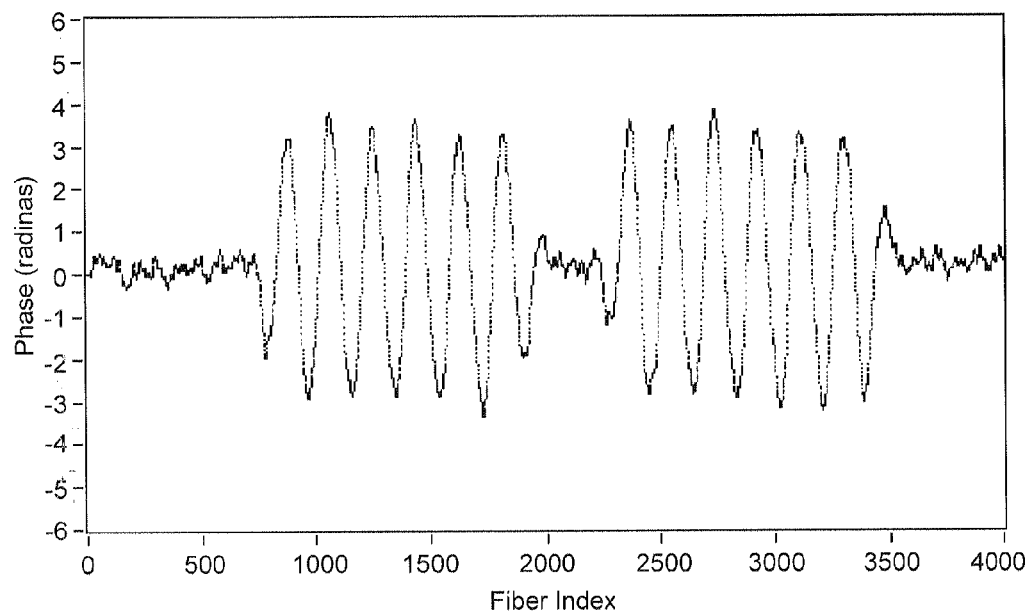
FIG. 15 depicts a zoom-in of a region of bend of an outer core of a twisted multicore optical fiber.

A substantial phase slope is observed in the strain response depicted in FIG. 13. This slope is a result of the pitch of the grating. In this case, the pitch of the grating is 20 nanometers over 28 millimeters, and the spacing between two coherent locations is 160 micrometers for a measurement taken over a 10 nanometer spectral range. Thus, change in center frequency as a result of the chirp of the grating between the two coherent indices is approximately 114 picometers. This spectral shift corresponds to a phase slope of approximately 1150 radians. To remove this slope and variations in the chirped grating that may cause a false strain measurement, a similar response calculated from the fiber in the baseline state can be subtracted. When this is done, the strain response is observed as depicted in FIG. 14, which oscillates in the region of a bend for a twisted multicore sensing fiber. An outer core of the fiber will experience alternating periods of elongation or compression as the fiber is bent at a rate equal to the twist of the outer cores. To illustrate, a close up of the first 4000 index of the strain response in FIG. 14 is depicted in FIG. 15.

This type of strain computation offers several advantages. First, the computation is executed on points that are separated by very short distances, on the order of 100 micrometers, and distortions as a result of vibration (an example of fiber movement) do not have enough length of fiber to accumulate and distort the strain measurement. Thus, the computation is highly robust to dynamic fiber motion. Second, the computation is only based on the measurement, and a static baseline response can be subtracted simplifying the processing. Third, the computation is independent of effects that occurred before that location, significantly simplifying algorithms used to extract strain and enable parallel operations executing along the length of the sensor.

The broadband nature of the CFBG fiber enables measurement of delay along the length of the fiber. While several methods exist for the extraction of delay, an example method is to resample a single given measurement into two different spectral representations of the sensor. Each response represents half of the spectral range of the original measurement and each will have a different center frequency. If a similar operation is performed on the baseline reference, a comparison of the phase difference between the two provides a measure of delay. A non-limiting example algorithm is shown in the flow chart in FIG. 16.

A measurement of a deployed sensor is obtained with an OFDR interrogation system. A baseline reference of the given sensor is obtained. Both the measurement and baseline reference data are Fourier transformed from the temporal domain to the spectral domain. The spectrums of both the measurement and baseline reference data are then truncated into two half data segments. The first half data segment represents the lowest frequency response in the spectrum while the later second half data segment represents the higher frequencies in the spectrum. All four half spectral data sets, first and second half measurement and first and second half baseline, are inverse Fourier transformed from the spectral domain to the temporal domain. The first half measurement data is complex multiplied with the complex conjugate of the first half baseline reference data. The second half measurement data is complex multiplied with the complex conjugate of the second half baseline reference data. The resulting product of the first half data sets is complex multiplied with the resulting product of the second half data sets. The data is converted to polar coordinates to extract a resulting phase signal along the length of the sensing fiber. This phase signal is proportional to delay along the length of the sensor.

While the delay result may be used in a variety of applications, one example is to use the delay to compensate for misalignment between measurement and baseline OFDR data sets, e.g., shift one of the data sets so that an accurate comparison can be made. In this way, an accurate phase measurement can be made.

Figure 16:
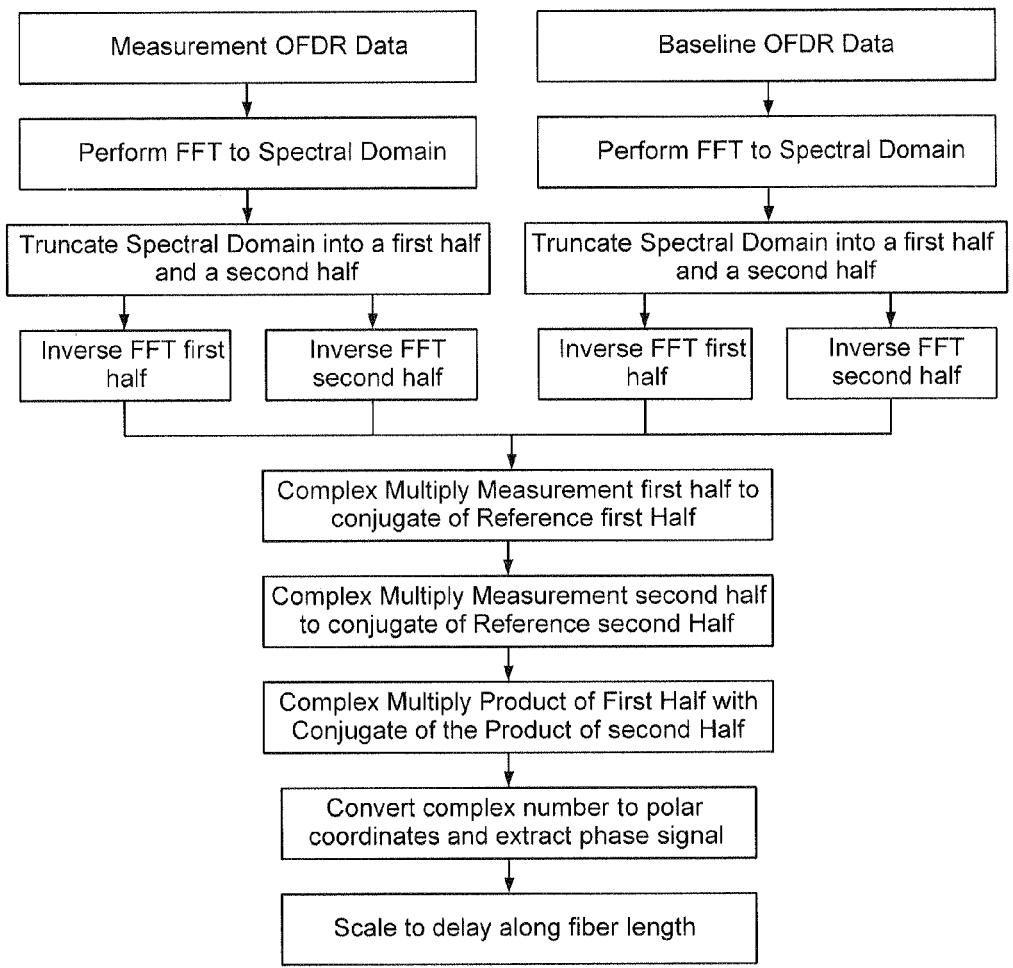
FIG. 16 is a flow chart showing an example algorithm for calculating delay by splitting the spectral response of a measurement into two responses.
Figure 17:
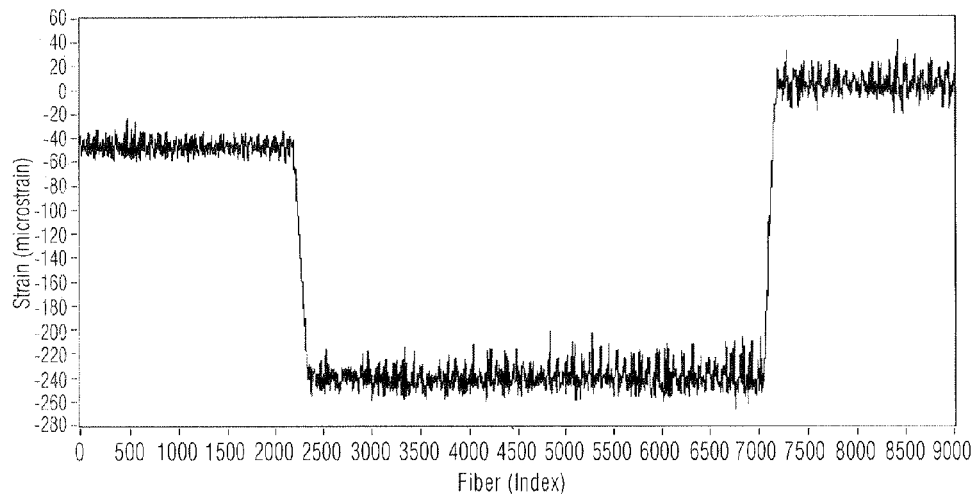
FIG. 17 shows an example strain profile of a CFBG fiber.
Figure 18:
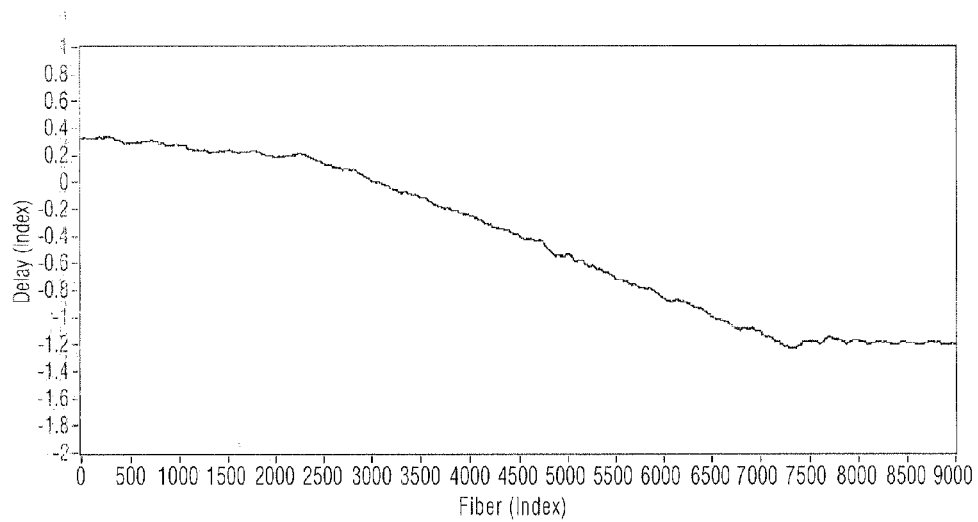
FIG. 18 is a graph showing a delay response of the CFBG with regions of different strain.

As an example, the algorithm in FIG. 16 was performed on an example test CFBG sensor which resulted in the strain depicted in FIG. 17. Areas of non-zero strain can cause an elongation or compression of the fiber. A delay mismatch will arise between a measurement and a baseline. Using the example algorithm shown in the flow chart of FIG. 16, the delay response can be calculated as depicted in FIG. 18, which shows that a slow accumulation of delay occurs up to index 2000. A region of higher strain between index 2000 and 7000 accumulates a greater delay. After index 7500, no strain is observed and the delay remains constant.

An alternative example delay calculation can be performed based on a recognition that the overlapping gratings create an interference pattern in the amplitude of the reflection. This amplitude is a function of the relative phase between the gratings at that point in the fiber, and therefore, does not change after the gratings are written. The spacing between the gratings (e.g., 5 nm) determines the center frequency of this pattern, and allows us to separate it from the background noise in the amplitude, and allows use of a simple phase comparison between the reference and the measurement to determine the delay difference between the two signals. In cases where there are three gratings present, and in cases where the reference and measurement have different grating present in the sweep range, this method may fail. Both of these cases, (the three gratings and the different gratings between measurement and reference) occur in the same place under low strain conditions.

In place of resampling the spectral response of the CFBG fiber, the chirped nature of the FBG may be used to extract a measure of alignment, or delay, along the length of the sensor. Recall the resulting phase slope that was produced from the strain computation depicted in FIG. 13. Neighboring coherent points in the temporal domain produce a phase slope due to each point representing a different frequency in of the chirped FBG. The baseline measurement has the same slope. If the strain of the measurement is misaligned in delay with respect to the baseline strain response, a phase offset is produced proportional to the misalignment.

Figure 19:
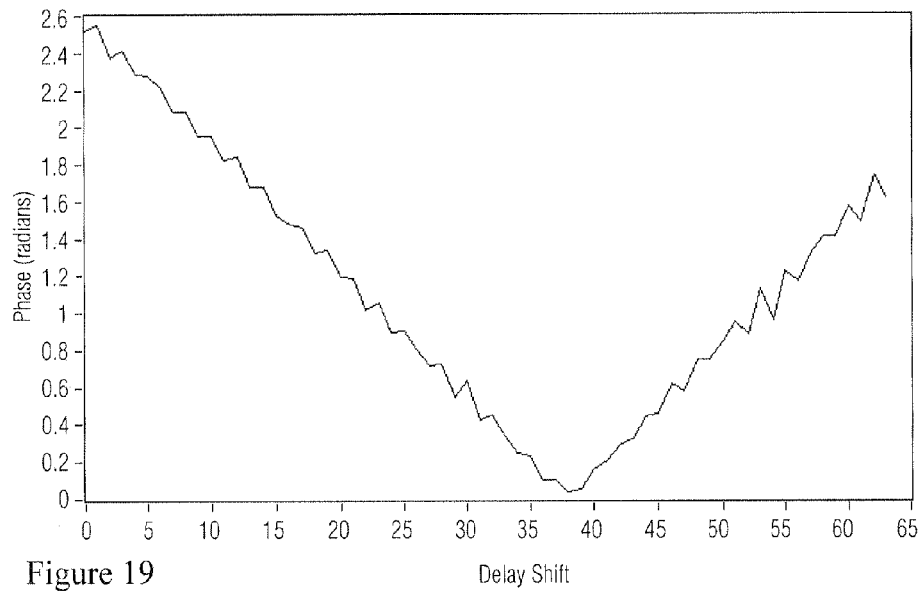
FIG. 19 is a graph showing two misaligned reference and measurement responses based on the phase offset between the slopes of the strain profile.

An algorithm may be used that systematically shifts the baseline strain response with respect to the measurement strain response at a location along the fiber and finds the minimum phase offset value. Since the phase offset value is proportional to delay, the signals are aligned when the offset is minimized. Alternatively the resulting phase value could be directly scaled to a measure of delay. The result of a shifting a reference with respect to the measurement is depicted in the example in FIG. 19 which shows that the phase offset is proportional to the shift between the measurement and baseline. A minimum peak is formed by taking the absolute value of the phase difference to facilitate detection of the minimum. The darker lined profile is compared to a similar measurement shifted by 8 indices in the temporal domain.

Figure 20:
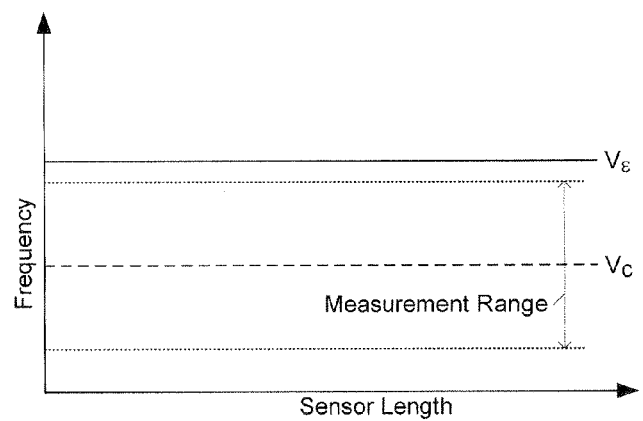
FIG. 20 shows that when a FBG sensor is uniformly strained such that the Bragg reflection frequency is shifted beyond the frequency range of a given measurement, no signal will be observed.

The following describes an example implementation of an extended reference. An extended reference is a technique in which a baseline measurement of a fiber is recorded over a frequency range that is greater than the frequency range of a given OFDR measurement. As the fiber is strained, its reflected spectrum will shift in frequency. In the case of a conventional FBG fiber, if the frequency shift is beyond the frequency span of a given measurement, no signal will be observed as shown in the example of FIG. 20.

Figure 21:
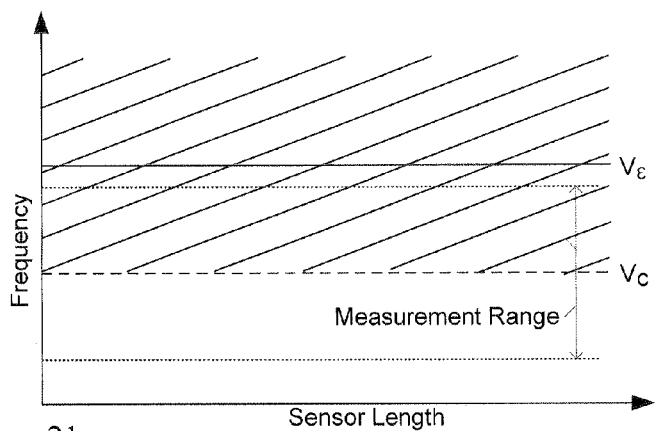
FIG. 21 illustrates that a CFBG sensor maintains signal when strained similar to a Rayleigh scatter based fiber enabling the use of an extended reference.

The extended reference technique can be implemented with scattering profiles that are broadband as is the case for the described Rayleigh scatter in "Registration of an Extended Reference for Parameter Measurement in an Optical Sensing System," US 2011038512. Thus, this technique may be further used with a CFBG fiber in example embodiments. The signal is not necessarily broadband, but due to the chirp, discrete frequencies are shifted into the measurement range as long as the chirp is written over a frequency range that exceeds the measurement spectral range. This is illustrated in an example of FIG. 21.

As the center frequency response of the fiber shifts, the entire frequency range of the written chirped grating shifts. In other words, frequencies that were first beyond the measurement band will shift into the measurement band. Hence, a chirped grating could be written over a range of, for example, 30 nanometers while a 10 nanometer measurement is performed to allow for shifts of the center frequency as high as 10 nanometers without loss of signal.

The technology increases the accuracy of parameter measurements. The CFBG optical fiber transmits light along a light guiding core similar to a conventional optical fiber. In standard optical fiber, light can be transmitted along a fast or slow axis based on the polarization of the light. OFDR uses a beamsplitter and two photodetectors to ensure detection of light that travels on both transmissions axis in the optical core. This is illustrated in the diagram of an OFDR network in FIG. 4. If a delay exists between light that is transmitted along these two axis, a beating can occur between the signals that is detrimental the accuracy of a parameter measurement of the fiber. The term beating is used to refer to the interaction between two signals in a way that produces a periodic response.

Figure 22:
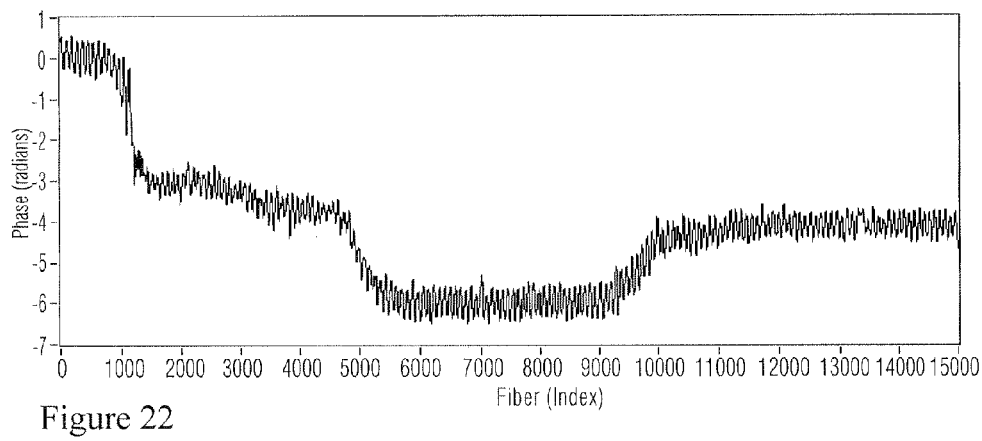
FIG. 22 shows a phase difference between example S and P responses of a CFBG fiber.
Figure 23:
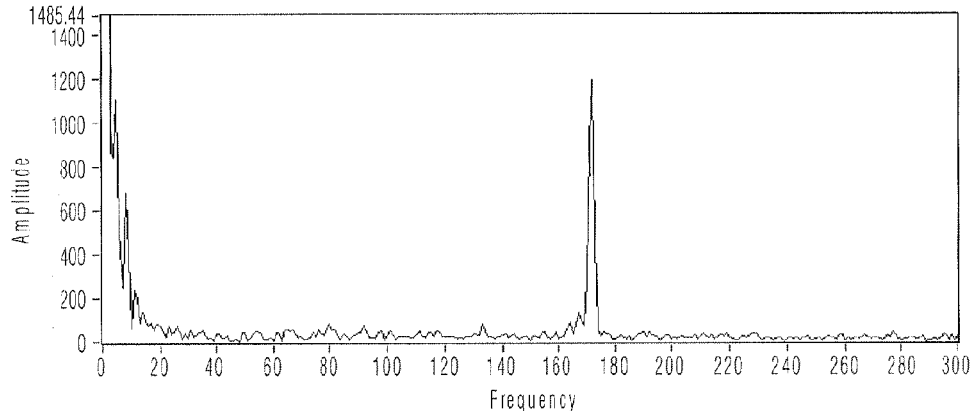
FIG. 23 graphs a frequency response of the phase oscillation observed between example S and P OFDR responses.

As an example, a phase difference between the S photodetector OFDR measurement and the P photodetector OFDR measurement is depicted in FIG. 22. In FIG. 22, a beating is observed along the length of the signal. A phase difference that accumulates between the states represents birefringence in the sensor. A Fourier transform of this signal produces a measure of the frequency of this beating as depicted in an example shown in FIG. 23.

The length of the displayed 15000 fiber index is 1.2 meter. An FFT of this signal produces a peak at 172, which corresponds to a spatial frequency of 7 millimeters. This is the spacing between overlapping gratings of the CFBG fiber.

Figure 24:
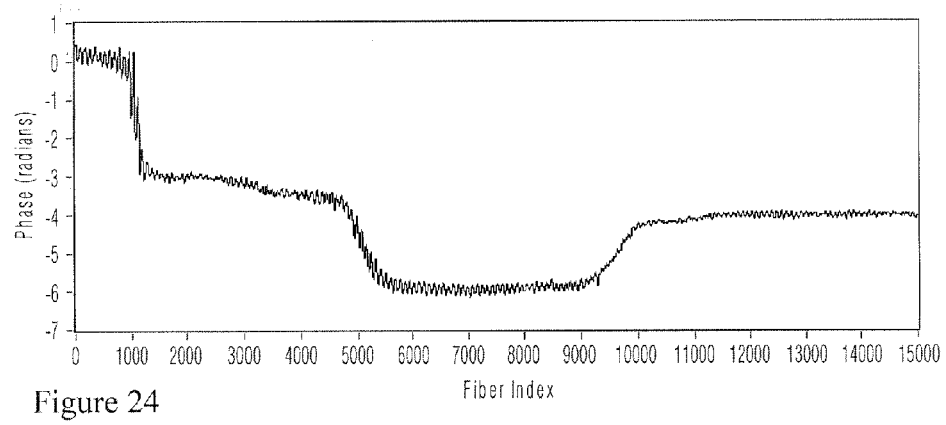
FIG. 24 is a graph showing oscillation between the example S and P states minimized with a delay offset between the S and P states.

If one accounts for a delay between the S and P states, which may arise for example as a result of Polarization Mode Dispersion in the internal optics, this oscillation can be minimized as depicted in the example of FIG. 24.

A residual oscillation is observed with a different amplitude based on location along the sensor. This indicates that a non constant delay shift would be required to completely remove the oscillation from the length of the sensor. Accounting for the beating between the two states will improve accuracy of the measurement of a desired parameter when utilizing a CFBG fiber.

There are a variety of additional applications. The overlapped chirped grating fiber is designed such that each location in the fiber reflects several discrete frequencies. The response of the OCG fiber may be filtered to isolate the response of only one of these signals and cause the fiber to behave similarly to a conventional FBG sensor. For example, if four frequencies were reflected at each location in the fiber, the response may be filtered to have four separate representations of the fiber, each similar to a conventional FBG sensor, by applying a quadratic phase response in the temporal domain to remove the slope on the frequency in the spectral domain. A band pass filter can then be placed at each reflected frequency to isolate that specific response. This allows highly robust strain measurements to be made in the presence of motion as there would be less of a restriction on the spatial coherence since overlapped frequencies would no longer interfere.

Figure 25:
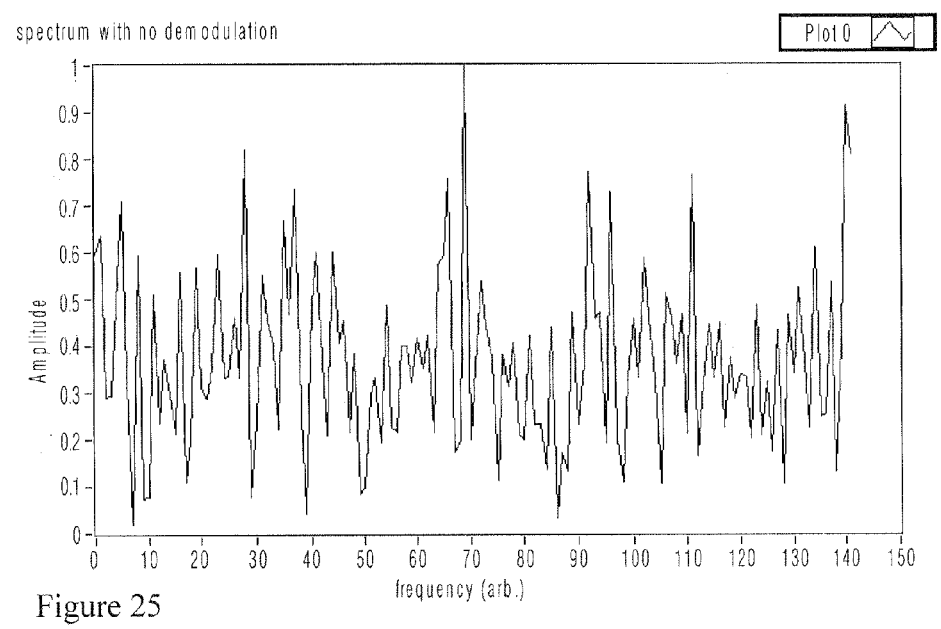
FIG. 25 shows an example spectral response of a CFBG fiber over a segment of fiber.

As an example of the above filtering technique, the spectral response of a chirped fiber over a segment in the temporal domain is depicted in the example of FIG. 25.

Figure 26:
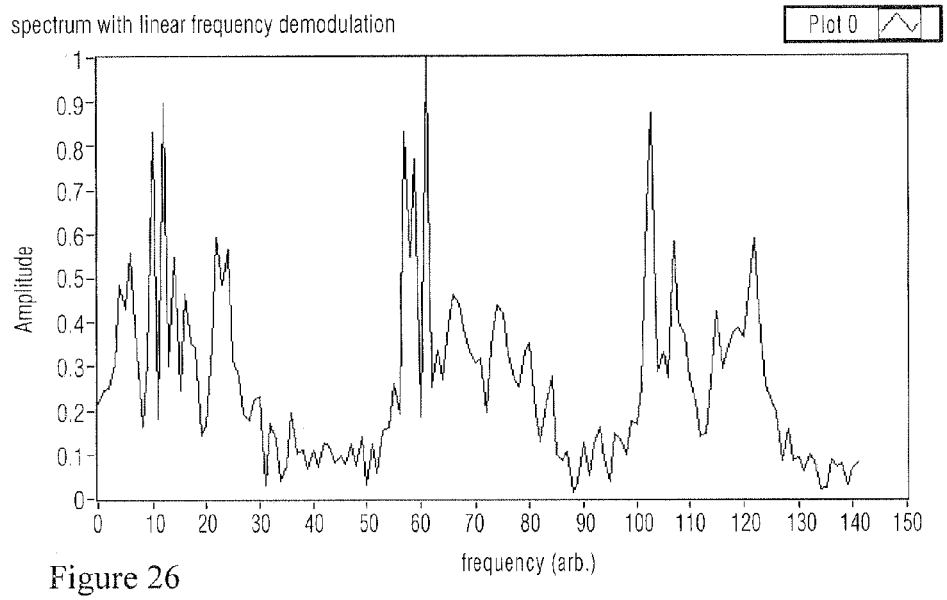
FIG. 26 is an example spectral response of a CFBG after a quadratic modulation applied in the spectral domain.

Since it is known that the fiber contains chirped gratings, one can modulate the complex reflection data with a parabolic phase representative of the expected chirp rate in the temporal domain. Doing this produces a spectrum showing grouping at the expected frequencies as depicted in the example of FIG. 26.

Figure 27:
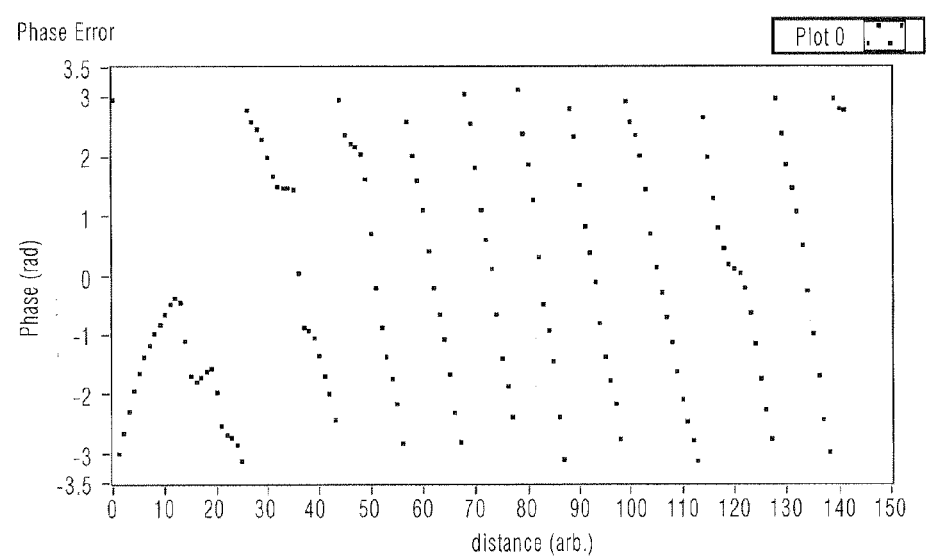
FIG. 27 graphs a phase deviation from a parabolic response depicting non-linearity in the chirped grating.

The beaks are broader than expected which implies that the chirped grating is not perfectly linear. To further refine the response, one can window around a peak to refine the quadratic response that was applied in the temporal domain. The found phase difference from parabolic is plotted in FIG. 27.

Figure 28:
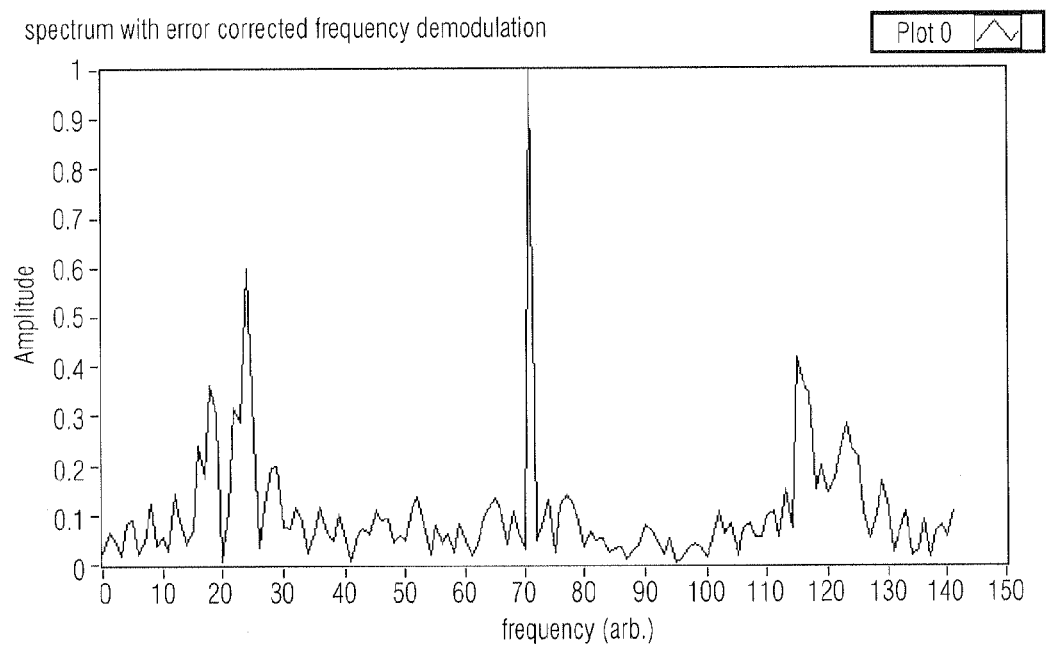
FIG. 28 graphs a spectral response after applying a refined quadratic response in the temporal domain.

Adding this phase deviation to the original applied quadratic response in the temporal domain, we see that a specific gratings response can be refined to a discrete frequency as depicted in FIG. 28.

This can be repeated along the length of the sensor, for each desired grating. Applying a bandpass around the refine frequency will isolate the response of a single chirped grating, effectively creating a conventional FBG sensor.

The CFBG scattering mechanism produces a broadband frequency response that allows direct computation of a delay mismatch along the length of the fiber and utilization of extended reference techniques. The scattering mechanism is periodically coherent along the length of the sensor, allowing one to directly calculate a measure of strain from a single scan. Due to the short distances between points, this strain computation is highly robust to distortions that occur due to motion of the sensor during a measurement. Since gratings are directly written into the fiber, high signal to noise can be manufactured increasing accuracy of strain measurements and allowing for more optical connections in a deployed OFDR network. Due to the chirped nature of the written FBGS, the gratings can be densely overlapped without phase distortions making the fiber easy to manufacture without defects. A CFBG fiber posses many desirable traits without the drawbacks that conventional scattering mechanisms suffer when used for fiber optic based strain sensing.

Although the description above contains many specifics, those specifics should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. An optical sensor for use with Optical Frequency Domain Reflectometry (OFDR) circuitry, the optical sensor comprising:
    an optical fiber inscribed with densely-overlapping, chirped-frequency fiber Bragg gratings at multiple locations along the optical fiber such that light reflected from a location of the multiple locations on the optical fiber is reflected at multiple frequencies in a range of frequencies, and
    wherein the densely-overlapping, chirped-frequency fiber Bragg gratings include three or more overlapping, chirped-frequency fiber Bragg gratings at each of the multiple locations, and
    wherein a reflection wavelength of at least one of the densely-overlapping, chirped-frequency fiber Bragg gratings exceeds a wavelength scan range of the OFDR circuitry and allows spectral shifts greater than the wavelength scan range of the OFDR circuitry to be measured by the OFDR circuitry.

2. The optical sensor in claim 1, wherein at least two of the densely-overlapping, chirped-frequency fiber Bragg gratings overlap at the location by more than 50%.

3. The optical sensor in claim 1, wherein the entire length of the optical fiber includes densely-overlapping, chirped-frequency gratings.

4. The optical sensor in claim 1, further comprising multiple optical light guiding cores within the optical fiber, each of the multiple optical light guiding cores being inscribed with densely-overlapping, chirped-frequency gratings.

5. An optical sensing system comprising:
an optical sensor including an optical fiber inscribed with overlapping, chirped-frequency fiber Bragg gratings at multiple locations along the optical fiber such that light reflected from a location on the optical fiber is reflected at multiple frequencies in a range of frequencies;
control circuitry, coupled to the optical fiber, including OFDR circuitry and configured to:
detect measurement reflection data from the optical fiber over the range of frequencies,
determine a change in the detected measurement reflection data over the range of frequencies, and
determine a parameter describing a state of the optical sensor based on the determined change in the detected measurement reflection data,
wherein a reflection wavelength of at least one of the overlapping, chirped-frequency fiber Bragg gratings exceeds a wavelength scan range of the OFDR circuitry and allows spectral shifts greater than the wavelength scan range of the OFDR circuitry to be measured by the OFDR circuitry.

6. The optical sensing system in claim 5, wherein the parameter is a measure of strain along a length of the optical sensor.

7. The optical sensing system in claim 5, wherein the parameter is a measure of change in optical phase along a length of the optical sensor.

8. The optical sensing system in claim 5, wherein the parameter is a measure of delay along a length of the optical sensor.

9. The optical sensing system in claim 8, wherein control circuitry is configured to:
obtain baseline reflection data for the optical sensor;
Fourier transform the baseline reflection data from a temporal domain into a spectral domain;
generate a first half spectral response of the baseline reflection data and a second half spectral response of the baseline reflection data;
Fourier transform the detected measurement reflection data from the temporal domain into the spectral domain;
generate a first half spectral response of the detected measurement reflection data and a second half spectral response of the detected measurement reflection data;
process the first half spectral response of the baseline reflection data and the first half spectral response of the detected measurement reflection data to determine a first result;
process the second half spectral response of the baseline reflection data and the second half spectral response of the detected measurement reflection data to determine a second result; and
determine the measure of delay based on the first and second results.

10. The optical sensing system in claim 9, wherein the control circuitry is configured to determine a phase difference from the processed first half spectral response and the processed second half spectral response.

11. The optical sensing system in claim 5, wherein the control circuitry is configured to:
obtain baseline reflection data for the optical sensor, and
determine a delay along a length of the optical sensor based on a comparison that uses the baseline reflection data and the detected measurement reflection data.

12. The optical sensing system in claim 5, wherein the control circuitry is configured to use a delay along the length of the optical sensor to compensate for a misalignment between the baseline reflection data and the detected measurement reflection data.

13. The optical sensing system in claim 5, wherein the detected measurement reflection data has a scattering amplitude greater than 10 dB.

14. The optical sensing system in claim 5, wherein the control circuitry is configured to determine a measure of a phase slope associated with a chirp rate of one of the overlapping, chirped-frequency fiber Bragg gratings, compare the measured phase slope to a phase slope generated from a baseline reflection measurement of the optical fiber, and determine a measure of strain at a location on the optical fiber based on the phase slope comparison.

15. The optical sensing system in claim 5, wherein the control circuitry is configured to determine a measure of a phase slope associated with a chirp rate of one of the overlapping, chirped-frequency fiber Bragg gratings, compare the measured phase slope to a phase slope generated from a baseline reflection measurement of the optical fiber to determine a phase offset, and determine a measure of delay at a location on the optical fiber based on the phase offset.

16. The optical sensing system in claim 5, wherein the control circuitry is configured to use the detected measurement reflection data to determine a measure of delay along the length of the optical fiber and use the measure of delay to determine a measure of strain along the length of the optical fiber.

17. The optical sensing system in claim 5, wherein the control circuitry is configured to extract a measure of delay along a length of the optical sensing fiber by analyzing amplitude fluctuations in the gratings inscribed along the length of the sensor due to interference of the inscribed gratings.

18. The optical sensing system in claim 5, wherein the control circuitry is configured to filter out one or more chirped frequency fiber Bragg grating scattering responses from the overlapped chirped frequency fiber Bragg gratings at a location along the optical sensor.

19. The optical sensing system in claim 5, wherein at least two of the overlapping, chirped-frequency fiber Bragg gratings overlap by more than 50%.

20. A method for making an optical sensor that includes an optical fiber for use with Optical Frequency Domain Reflectometry (OFDR) circuitry, the method comprising:
inscribing a first chirped-frequency, light refracting pattern on the optical fiber at every measurement point along at least a portion of the length of the optical sensor; and
inscribing a second chirped-frequency, light refracting pattern on the optical fiber that overlaps the first chirped-frequency, light refracting pattern at every measurement point along at least the portion of the length of the sensor, the second chirped-frequency, light refracting pattern having a same pattern as the first chirped-frequency, light refracting pattern,
inscribing a third chirped-frequency, light refracting pattern on the optical fiber that overlaps the first and second chirped-frequency, light refracting patterns at every measurement point along at least the portion of the length of the sensor, the third chirped-frequency, light refracting pattern having a same pattern as the first and second chirped-frequency, light refracting patterns, wherein the optical fiber inscribed with the overlapping first, second, and third chirped-frequency, light refracting patterns reflects light from a location on the optical fiber at multiple frequencies in a range of frequencies, and wherein at least one of multiple reflection wavelengths of the overlapping first, second, and third chirped-frequency, light refracting patterns exceeds a wavelength scan range of the OFDR circuitry and allows spectral shifts greater than the wavelength scan range of the OFDR circuitry to be measured by the OFDR circuitry.

21. The method in claim 20, wherein the first, second, and third chirped-frequency, light refracting patterns overlap at every point along the entire length of the sensor.

22. The method in claim 20, wherein the first, second, and third chirped-frequency, light refracting patterns create an overlapped modulated index of refraction pattern.

23. The method in claim 20, wherein at least two of the first, second, and third chirped-frequency, light refracting patterns overlap by more than 50%.

24. A method for an optical system that includes an optical fiber inscribed with overlapping, chirped-frequency fiber Bragg gratings at multiple locations along the optical fiber such that light reflected from a location on the optical fiber is reflected at multiple frequencies in a range of frequencies and OFDR circuitry coupled to the optical fiber, the method comprising:

detecting measurement reflection data from the optical fiber over the range of frequencies, determining a change in the detected measurement reflection data over the range of frequencies, and determining a parameter describing a state of the optical fiber based on the determined change in the detected measurement reflection data, wherein a reflection wavelength of at least one of the overlapping, chirped-frequency fiber Bragg gratings exceeds a wavelength scan range of the OFDR circuitry and allows spectral shifts greater than the wavelength scan range of the OFDR circuitry to be measured by the OFDR circuitry.

25. The method in claim 24, further comprising:
obtaining baseline reflection data for the optical fiber;
Fourier transforming the baseline reflection data from a temporal domain into a spectral domain;
generating a first half spectral response of the baseline reflection data and a second half spectral response of the baseline reflection data;
Fourier transforming the detected measurement reflection data from the temporal domain into the spectral domain;
generating a first half spectral response of the detected measurement reflection data and a second half spectral response of the detected measurement reflection data;
processing the first half spectral response of the baseline reflection data and the first half spectral response of the detected measurement reflection data to determine a first result;
processing the second half spectral response of the baseline reflection data and the second half spectral response of the detected measurement reflection data to determine a second result; and
determining a measure of delay based on the first and second results.

26. The method in claim 24, further comprising:
obtaining baseline reflection data for the optical fiber, and
determining a delay along a length of the optical fiber based on a comparison that uses the baseline reflection data and the detected measurement reflection data.

* * * * *